US011027337B2

(12) United States Patent
Jonsson et al.

(10) Patent No.: US 11,027,337 B2
(45) Date of Patent: Jun. 8, 2021

(54) SET OF CUTTING INSERTS AND METHODS OF MAKING A SET OF CUTTING INSERTS

(71) Applicant: SECO TOOLS AB, Fagersta (SE)

(72) Inventors: Mats Jonsson, Hedemora (SE); Per Jonsson, Fors (SE); Jonas Thuresson, Fagersta (SE); Maria Stromberg Bylund, Fagersta (SE); Mikael Gronquist, Norrkoping (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 15/928,931

(22) Filed: Mar. 22, 2018

(65) Prior Publication Data
US 2018/0272432 A1    Sep. 27, 2018

(30) Foreign Application Priority Data
Mar. 23, 2017   (EP) ..................... 17162545

(51) Int. Cl.
*B23C 5/00*     (2006.01)
*B23B 27/00*    (2006.01)
(Continued)

(52) U.S. Cl.
CPC ............ *B23B 27/145* (2013.01); *B22F 3/225* (2013.01); *B22F 10/20* (2021.01); *B23B 27/14* (2013.01); *B23C 5/207* (2013.01); *B23C 5/2213* (2013.01); *B23P 15/28* (2013.01); *B33Y 10/00* (2014.12); *B33Y 80/00* (2014.12); *C22C 29/08* (2013.01); *B22F 5/003* (2013.01); *B22F 2005/001* (2013.01); *B23B 2222/28* (2013.01); *B23B 2270/16* (2013.01); *B28B 1/001* (2013.01); *B28B 1/24* (2013.01)

(58) Field of Classification Search
CPC ............ B23B 2210/12; B23B 2270/16; B23B 27/145; B23C 5/207; B23C 5/2213; B23P 15/28; Y10T 407/1924; Y10T 407/23
See application file for complete search history.

(56) References Cited

U.S. PATENT DOCUMENTS 5,882,152 A * 3/1999 Janitzki ................. B23B 51/02
407/32
6,244,790 B1   6/2001 Kingdom et al.
(Continued)

FOREIGN PATENT DOCUMENTS

CN    1646245 A    6/2005
CN    1917976 A    2/2007
(Continued)

*Primary Examiner* — Sara Addisu
(74) *Attorney, Agent, or Firm* — Corinne R. Gorski

(57) ABSTRACT

A set of cutting inserts includes a stem portion, a plurality of branch portions attached to and extending from the stem portion, and at least one cutting insert attached to each of the plurality of branch portions. The stem portion has a longitudinal axis extending between a top end of the stem portion and a bottom end of the stem portion and at least one of the top end of the stem portion is disposed along the longitudinal axis above uppermost portions of each cutting insert, and the bottom end of the stem portion is disposed along the longitudinal axis below lowermost portions of each cutting insert. Also, methods for manufacturing a set of cutting inserts are disclosed.

13 Claims, 7 Drawing Sheets

(51) Int. Cl.
*B23B 27/14* (2006.01)
*B23C 5/22* (2006.01)
*C22C 29/08* (2006.01)
*B22F 3/22* (2006.01)
*B22F 10/20* (2021.01)
*B33Y 10/00* (2015.01)
*B33Y 80/00* (2015.01)
*B23C 5/20* (2006.01)
*B23P 15/28* (2006.01)
*B22F 5/00* (2006.01)
*B28B 1/00* (2006.01)
*B28B 1/24* (2006.01)

(56) References Cited

U.S. PATENT DOCUMENTS

| | | | |
|---|---|---|---|
| 6,286,406 B1 | 9/2001 | Viswanadham et al. | |
| 8,491,233 B2 | 7/2013 | Edler et al. | |
| 2001/0022123 A1* | 9/2001 | Schiffers | B23B 27/08 82/158 |
| 2004/0250423 A1* | 12/2004 | Yu | B23D 61/12 30/123 |
| 2007/0065240 A1* | 3/2007 | Berger | B23B 27/04 407/117 |
| 2007/0084316 A1* | 4/2007 | Trice | B23B 27/06 82/1.11 |
| 2010/0126316 A1* | 5/2010 | Kwak | B23B 51/02 81/440 |
| 2010/0150672 A1* | 6/2010 | Edler | B23B 27/00 407/120 |
| 2010/0158622 A1* | 6/2010 | Kaufmann | B23B 27/04 407/107 |
| 2011/0293382 A1* | 12/2011 | Chistyakov | B23B 27/04 407/70 |
| 2014/0072379 A1* | 3/2014 | Hecht | B23B 29/24 407/70 |
| 2015/0183029 A1* | 7/2015 | Makhlin | B23B 27/04 407/69 |
| 2019/0091774 A1* | 3/2019 | Xie | B23B 47/287 |

FOREIGN PATENT DOCUMENTS

| | | |
|---|---|---|
| CN | 102256729 A | 11/2011 |
| CN | 202114330 U | 1/2012 |
| CN | 106312074 | 1/2017 |
| JP | S5743903 U | 3/1982 |
| JP | 2003193106 A | 7/2003 |
| WO | 2017038929 A1 | 3/2017 |

\* cited by examiner

SET OF CUTTING INSERTS AND METHODS OF MAKING A SET OF CUTTING INSERTS

RELATED APPLICATION DATA

This application claims priority under 35 U.S.C. § 119 to EP Patent Application No. 17162545.2, filed on Mar. 23, 2017, which the entirety thereof is incorporated herein by reference.

TECHNICAL FIELD

The present disclosure relates to cutting inserts and, more particularly, to sets of cutting inserts and methods for making sets of cutting inserts. The disclosure further relates to a mold for forming the set of cutting inserts and to methods of machining a groove using a cutting insert.

BACKGROUND

Replaceable cutting inserts for cutting tools are commonly made one at a time via a manufacturing process involving pressing a carbide powder in a mold to form a green insert, then sintering the green insert and, afterwards, if necessary performing additional grinding or finishing processes.

Inserts having complex shapes are costly to produce (either with traditional pressing or by utilizing Multi Axial Pressing (MAP) and/or Powder Injection Molding (PIM) techniques), and often they are subjected to high cost operations such as grinding and fixturing one-by-one. Manufacture of any type of insert and in particular of small grooving or parting-off inserts via such a pressing technique can be particularly difficult. First, pressing thin inserts can be difficult. Further, handling and fixturing them through the production process can be difficult. Many inserts disappear during the production process, such as in the course of edge preparation.

U.S. Pat. No. 8,491,233 provides a cutting insert kit in the form of a plurality of cutting inserts that are manufactured together and are connected to one another by a connection member. The insert kit is manufactured by a conventional pressing and sintering technique.

It is desirable to minimize lost parts and to simplify the manufacturing process for cutting inserts.

SUMMARY

In accordance with a first aspect of the invention, a set of cutting inserts includes a stem portion, a plurality of branch portions attached to and extending from the stem portion, and at least one cutting insert attached to each of the plurality of branch portions. The set is entirely or partly made by injection molding and/or additive manufacturing and comprises tungsten carbide, such that cutting inserts can be easily handled as a set during subsequent handling, i.e. many cutting inserts can be handled as a single piece.

In accordance with a second aspect of the invention, the stem portion has a longitudinal axis extending between a top end of the stem portion and a bottom end of the stem portion and at least one of the top end of the stem portion is disposed along the longitudinal axis above uppermost portions of each cutting insert, and the bottom end of the stem portion is disposed along the longitudinal axis below lowermost portions of each cutting insert.

The set of cutting inserts according to at least one of these aspects of the disclosure can offer advantages including keeping a series of inserts together in a single location during forming and processing, thereby reducing lost products. Additionally, the set of cutting inserts can be made by an injection molding process and/or an additive manufacturing process which can be advantageous, particularly for thinner inserts which can be difficult to form by conventional pressing techniques. Further, the stem can function as a handle for the set of inserts. The inserts can be detached from the set after processing is partly of fully completed, or as needed by an end user.

In accordance with another aspect of the disclosure, a method of making a set of cutting inserts includes injecting material for forming the set of cutting inserts into a mold through a runner system comprising a sprue channel and a plurality of runner channels attached to and extending from the sprue channel and into at least one mold cavity for forming a cutting insert attached to each of the plurality of runner channels to form a molded component, and ejecting the molded component from the mold to produce the proposed set of cutting insert.

In accordance with still another aspect of the disclosure, a method of making the proposed set of cutting inserts by additive manufacturing includes the steps of:

(a) depositing a tungsten carbide powder material in a bed or configuration;

(b) selectively fusing the tungsten carbide powder material by scanning the layers generated by a three-dimensional modeling program on the surface of the powder bed using a laser;

(c) relative lowering of the powder bed by one layer thickness, (d) repeating steps (a) to (c) until the proposed set of cutting inserts is formed; and (e) optionally post processing the set of cutting inserts.

In accordance with yet another aspect of the disclosure, a method of making the proposed set of by additive manufacturing, includes the steps of:

(a) depositing a tungsten carbide powder material layer in a bed or configuration;

(b) selectively depositing a binder adhesive onto the tungsten carbide powder material layer;

(c) relative lowering of the powder bed by one layer thickness, (d) repeating steps (a) to (c) until the set of cutting inserts is formed;

(e) sintering of the set of cutting inserts, and (f) optionally post processing of the set of cutting inserts.

As with the set of inserts, the methods according to these aspects of the disclosure also facilitate keeping a plurality of inserts together during the manufacturing, thereby tending to reduce lost products. The methods can be advantageous for the manufacture of thinner inserts. After producing the set of inserts, the stem can function as a handle for the set of inserts. The inserts can be detached from the set after processing is partly or fully completed, or as needed by an end user.

According to another aspect of the disclosure, a cutting insert for grooving obtained from the proposed set of cutting inserts is provided, the cutting insert comprising a fracture surface located on the side surface, wherein the fracture surface results from removing the cutting insert from the branch portion wherein the fracture surface is remote from the median plane, wherein, as measured in a direction perpendicular to the median plane, the largest distance between the median plane and each point of the fracture surface is smaller than the largest distance between the first wall cutting edge and the median plane. The largest distance between the first wall cutting edge and the median plane can be from for example, 0.75 mm to 4 mm, from 1 mm to 3 mm and from 1.5 mm to 2 mm. The fracture surface is remote from the median plane which means that the median plane does not intersect the fracture surface.

According to another aspect of the disclosure, a method of machining a groove in a workpiece using a proposed cutting insert is provided, wherein the bottom cutting edge is used for forming a bottom of the groove and wherein the first and second wall cutting edges are simultaneously used for forming side walls of the groove, wherein the fracture surface of the cutting insert is located within the machined groove and facing one of the side walls of the groove, and wherein a clearance is provided between the fracture surface and the side wall of the groove. The width of the groove can be for example, from 1.5 mm to 8 mm, from 2 mm to 6 mm and from 3 mm to 4 mm. Accordingly, the largest distance between the first wall cutting edge and the second cutting edge can be from, for example, 1.5 mm to 8 mm, from 2 mm to 6 mm and from 3 mm to 4 mm.

According to another aspect of the disclosure, a mold for forming the proposed set of cutting inserts by injecting material for forming the set of cutting inserts into the mold to form a molded component is provided, the mold comprising a plurality of mold cavities for forming the cutting inserts and a runner system, wherein the runner system includes a sprue channel and a plurality of runner channels, wherein each runner channel is attached to and extends from the sprue channel and into at least one of the mold cavities, and wherein the mold is arranged for ejecting the molded component from the mold to produce the set of cutting inserts.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1A:
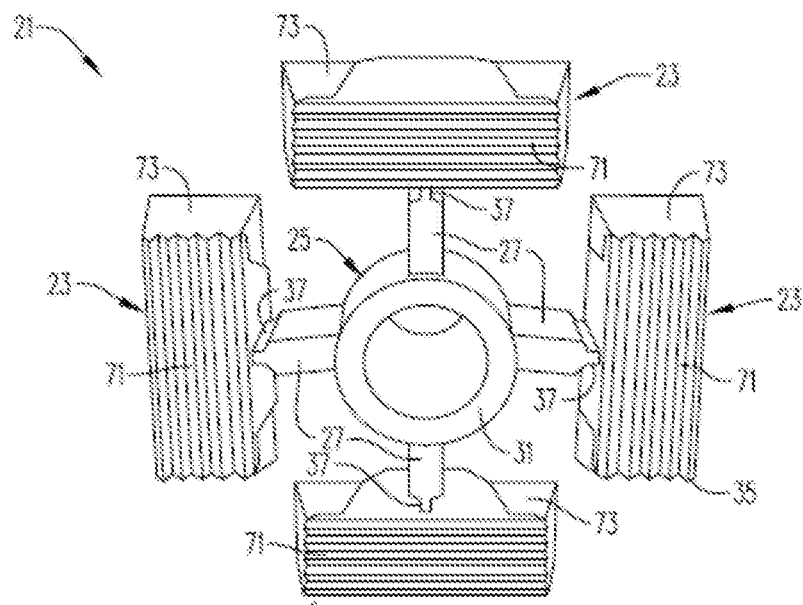
FIGS. 1A and 1B are bottom and top perspective views of a set of cutting inserts according to an aspect of the present disclosure.
Figure 1B:
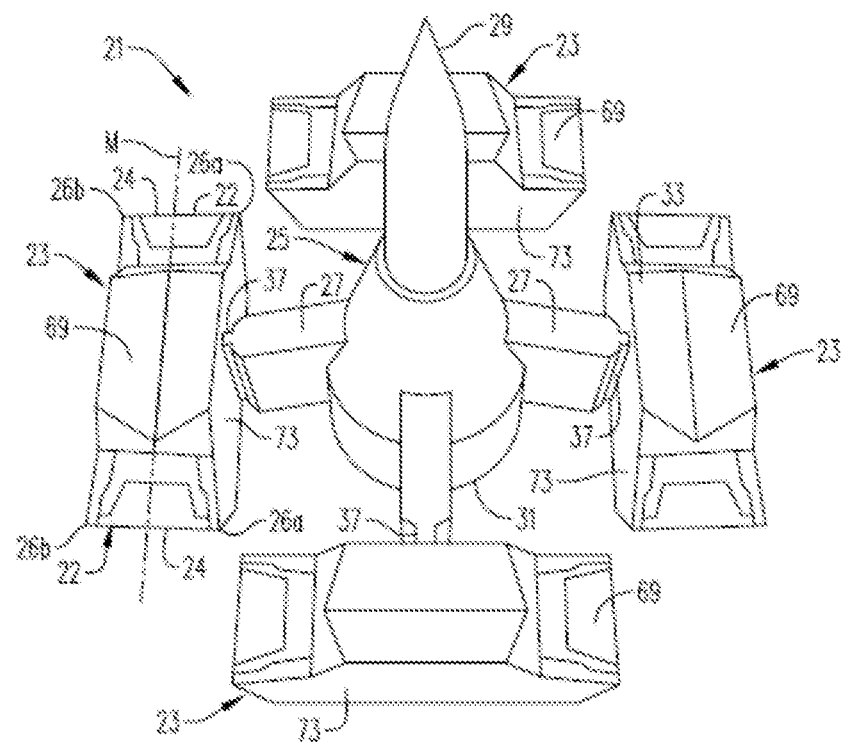

A set 21 of cutting inserts 23 according to an aspect of the present disclosure is shown in FIGS. 1A and 1B and includes a sprue portion, supporting structure or stem portion 25, a plurality of runner portions or branch portions 27 attached to and extending from the stem portion, and at least one cutting insert 23 attached to each of the plurality of branch portions. The stem portion 25 has a longitudinal axis extending between a top end 29 and a bottom end 31 of the stem portion and at least one of the top end and the bottom end of the stem portion is disposed above and below, respectively, uppermost and lowermost portions 33 and 35, respectively, of each cutting insert 23. In other words, at least one of (A) a top end 29 of the stem portion 25 is disposed along the longitudinal axis above uppermost portions 33 of each cutting insert 23, and (B) a bottom end 31 of the stem portion is disposed along the longitudinal axis below lowermost portions 35 of each cutting insert.

As seen in FIGS. 2A-2C, 4, 5, 6, and 7A, sets 21a, 21b, 21c, 121, 221, 321, and 421, respectively, of cutting inserts 23a, 23b, 23c, 123, 223, 323, and 423, respectively, also have stem portions 25a, 25b, 25c, 125, 225, 325, 425, respectively, that have respective longitudinal axes extending between top and bottom ends of the stem portions and at least one of a top end of the stem portion is disposed along the longitudinal axis above uppermost portions of each cutting insert, and a bottom end of the stem portion is disposed along the longitudinal axis below lowermost portions of each cutting insert, which can facilitate, inter alia, forming the sets of cutting inserts by an injection molding process, processing the set of inserts with reduced risk of loss, and carrying the inserts as a set from which individual inserts can be removed as required.

The cutting inserts shown in FIG. 1A are disclosed in U.S. Pat. No. 6,244,790, the content of which is incorporated by reference. Each cutting insert shown in FIGS. 1A and 1B has a length direction that extends perpendicular or substantially perpendicular to a direction of the associated branch portion 27.

Figure 2A:
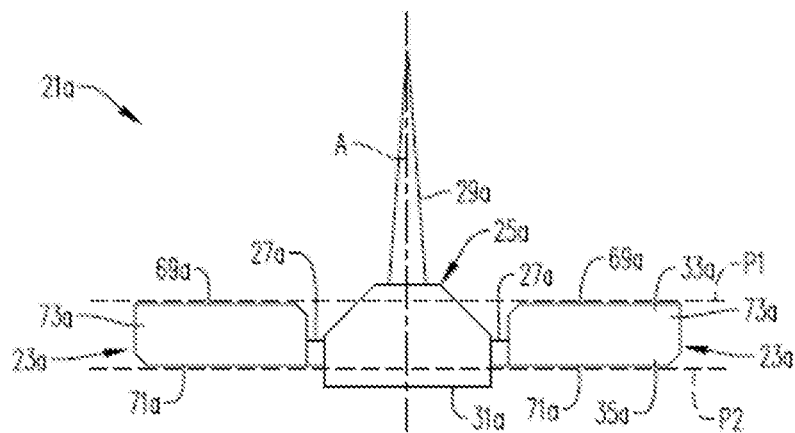
FIGS. 2A-2C are side views of sets of cutting inserts according to further aspects of the present disclosure.
Figure 2B:
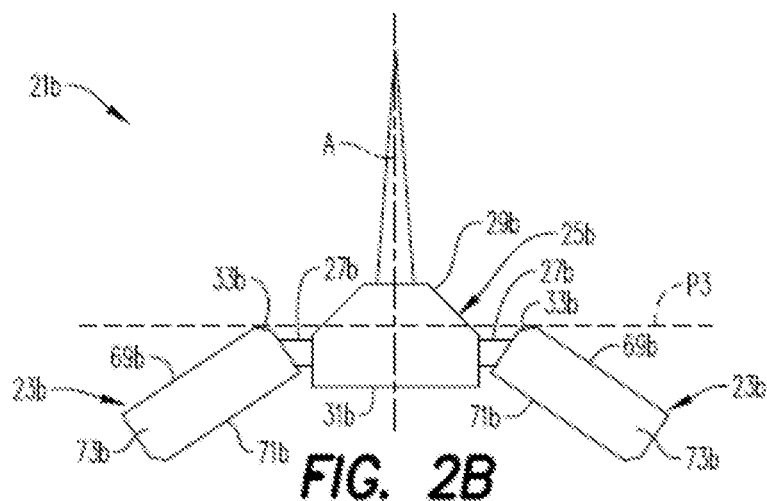
Figure 2C:
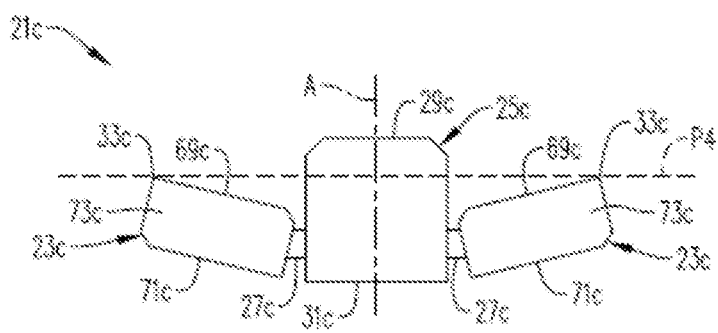

FIGS. 2A, 2B, and 2C show embodiments of sets 21a, 21b, 21c, respectively, of cutting inserts 23a, 23b, 23c, respectively, with stem portions 25a, 25b, 25c, respectively, each having a longitudinal axis A extending between top ends 29a, 29b, 29c and bottom ends 31a, 31b, and 31c of the stem portions. For each stem portion 25a, 25b, 25c, at least one of the top end 29a, 29b, 29c of the stem portion is disposed above the uppermost portion 33a, 33b, 33b of the cutting inserts 23a, 23b, 23c, and a bottom end 31a, 31b, 31c of the stem portion is disposed below lowermost portions 35a, 35b, 35c of each cutting insert 23a, 23b, 23c. In FIG. 2A, the top end 29a and the bottom end 31a of the stem portion 25a are located above and below, respectively, the uppermost and lowermost portions 33a and 35a, respectively, of the cutting insert 23a. In FIG. 2B, the top end 29b of the stem portion 25b is located above the uppermost portion 33b of the cutting insert 23b. In FIG. 2C, the top end 29c of the stem portion 25c is located above the uppermost portion 33c of the cutting insert 23c and the bottom end 31c is even with or below the lowermost portion 35c of the cutting insert.

At least one extreme point of the uppermost and lowermost portions 33a, 33b, 33c and 35a, 35b, 35c, respectively, of each cutting insert 23a, 23b, 23c may be disposed in an upper axial plane P1 (FIG. 2A), P3 (FIG. 2B), or P4 (FIG. 2C) or a lower axial plane P2 (FIG. 2A), wherein the planes are perpendicular to the longitudinal axis A. At least one part of the stem portions 25a, 25b, 25c projects above the upper axial plane P1, P3, or P4 and/or the lower axial plane P2.

As seen with reference to, e.g., FIGS. 1A and 1B, a gate portion 37 is ordinarily provided between each branch portion 27 and each cutting insert 23. As seen in FIG. 1D, each gate portion 37 has a smaller cross-sectional area AG (illustrated as a shaded portion of the gate portion) in a direction perpendicular to a longitudinal dimension LG (FIG. 1D) of the gate portion than a cross-sectional area AR (illustrated as a shaded portion of the branch portion) of the branch portion 27 in a direction perpendicular to a longitudinal dimension LR for each branch portion. The longitudinal dimension LG of the gate portion 37 is measured between the branch portion 27 and the cutting insert 23, and the longitudinal dimension LR of the branch portion is measured between the stem portion (branch portion 27 shown to point where it meets the stem portion, which is not shown in FIG. 1D) and the gate portion. Typically, each branch portion 27 has a smaller cross-sectional area AR in a direction perpendicular to the longitudinal dimension LR of the branch portion than a cross-sectional area AI (illustrated as a shaded portion of the cutting insert 23) of each cutting insert associated with the branch portion in the direction perpendicular to a longitudinal dimension of the branch portion.

Figure 7A:
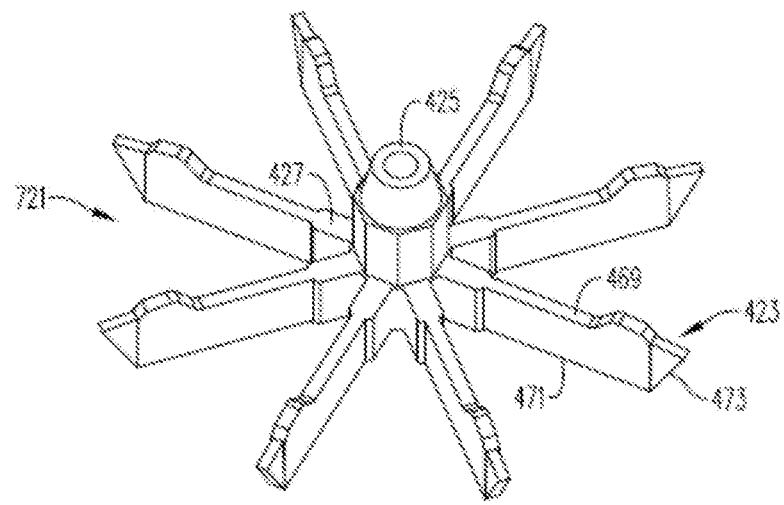
FIGS. 7A and 7B are top and bottom perspective views of a set of cutting inserts according to an aspect of the present disclosure.
Figure 7B:
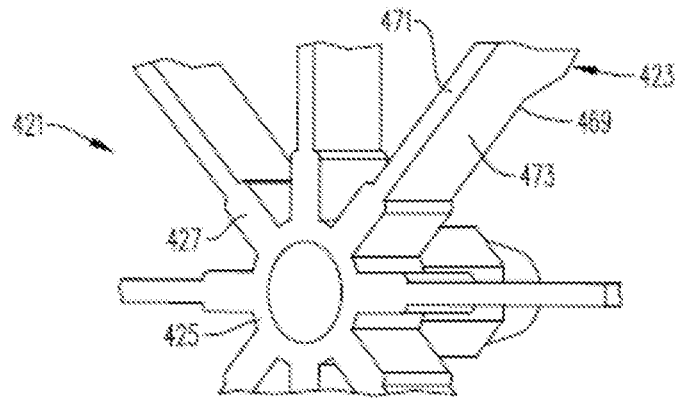
Figure 7C:
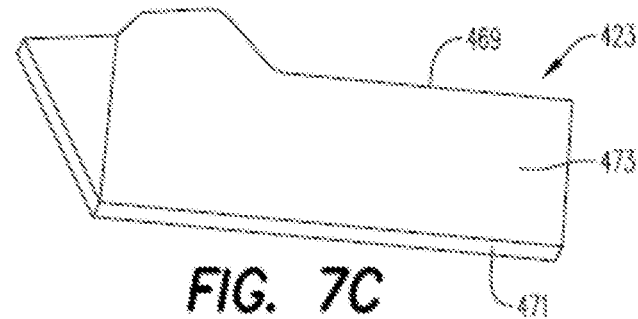
FIG. 7C is a cutting insert separated from the set of cutting inserts shown in FIGS. 7A and 7B.

As seen in FIGS. 7A-7B, however, the branch portion 427 can have a greater cross-sectional area than the cutting insert 423. The cutting insert 423 may be detachable from the set 421 of cutting inserts where it meets the branch portion 427 or, if provided, a gate portion (not shown). A narrower gate may be provided between the branch portion 427 and the cutting insert 423 to facilitate separation of the cutting insert from the set 421, however, this is not necessary.

Figure 3A:
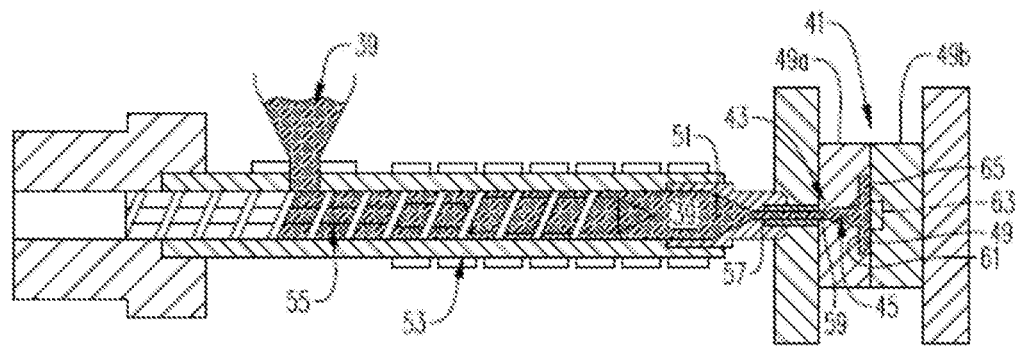
FIG. 3A is a schematic, cross-sectional side view of an injection molding apparatus for making sets of inserts according to a method aspect of the present disclosure.
Figure 3B:
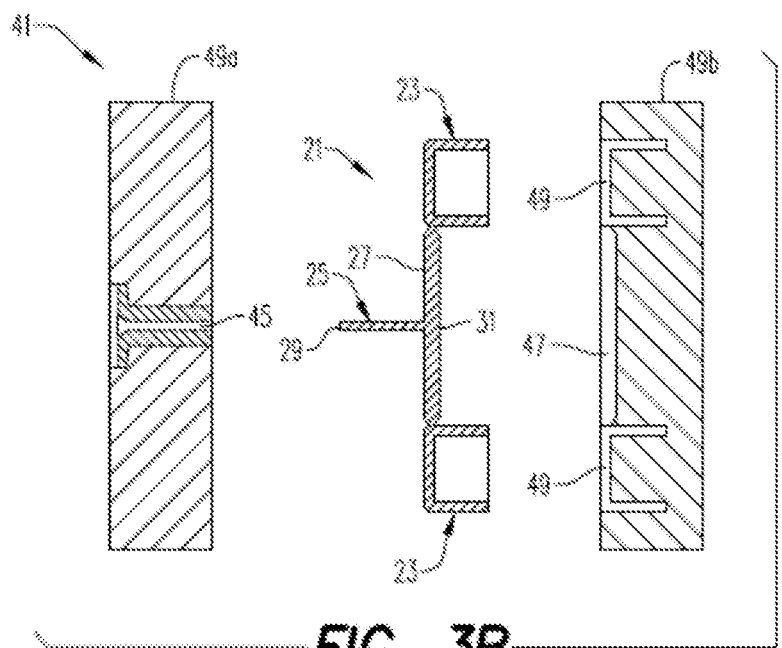
FIG. 3B is a schematic, cross-sectional side view of a portion of a mold for making sets of inserts according to the method aspect of the present disclosure.

The set 21 of cutting inserts 23 can be made, according to an aspect of the disclosure, by a method illustrated in FIGS. 3A and 3B. As seen in FIG. 3A, the method includes injecting material 39 for forming the set of cutting inserts into a mold 41 through a runner system 43 comprising a sprue channel 45 and a plurality of runner channels 47 (FIG. 3B) attached to and extending from the sprue channel and into at least one mold cavity 49 for forming a cutting insert attached to each of the plurality of runner channels, thereby forming a molded component. The material 39 may be tungsten carbide and a bearer, plastics for example, that are mixed and shaped to pellets or granulate.

As seen in FIG. 3B, which shows only the mold 41 (illustrated with a mold cavity 49 different from the mold cavity of FIG. 3A) and a molded component, mold plates 49a and 49b forming the mold cavity 49 are separated by moving a movable one 49b of the mold plates and the molded component is then ejected from the mold 41, when solidified, by ejectors (not shown) to produce, e.g., a set 21 of cutting inserts 23 such as the illustrative set of FIGS. 1A-1B, the set of cutting inserts comprising the stem portion 25, the plurality of branch portions 27 attached to and extending from the stem portion, and at least one cutting insert 23 attached to each of the plurality of branch portions. The set of cutting inserts is then sintered and possibly post processing can be performed, such as grinding, coating, etc.

The material 39 injected into the mold 41 is typically injected from an injection chamber 51 of a barrel 53 in which a rotating and reciprocating screw 55 is provided according to conventional injection molding techniques. The longitudinal axis of the sprue channel 45 typically is aligned with the barrel 53 and an outlet 57 of the injection chamber 51 where, in a finished set of inserts such as the set 21 shown in FIG. 3B, the top end 29 of the stem portion 25 is typically closest to the outlet 57 of the injection chamber and the bottom end 31 of the stem portion is furthest from the outlet of the injection chamber.

A portion 59 of the sprue channel 45 closest to the outlet 57 of the injection chamber 51 typically extends beyond a surface 61 of the mold cavity 49 closest to the outlet of the injection chamber, in a direction toward the injection chamber. A further portion 63 (shown in phantom in FIG. 3A) of the sprue channel 45 furthest from the outlet 57 of the injection chamber 51 can extend beyond a surface 65 of the mold cavity 49 furthest from the outlet of the injection chamber, in a direction away from the injection chamber. Via a mold 41 with a sprue channel 45 as described, it is possible to produce the set 21 of cutting inserts with the stem portion 25 having the longitudinal axis A with at least one of the top end 29 being disposed above uppermost portions 33 of each cutting insert, and the bottom end 31 of the stem portion being disposed below lowermost portions 35 of each cutting insert.

Figure 1C:
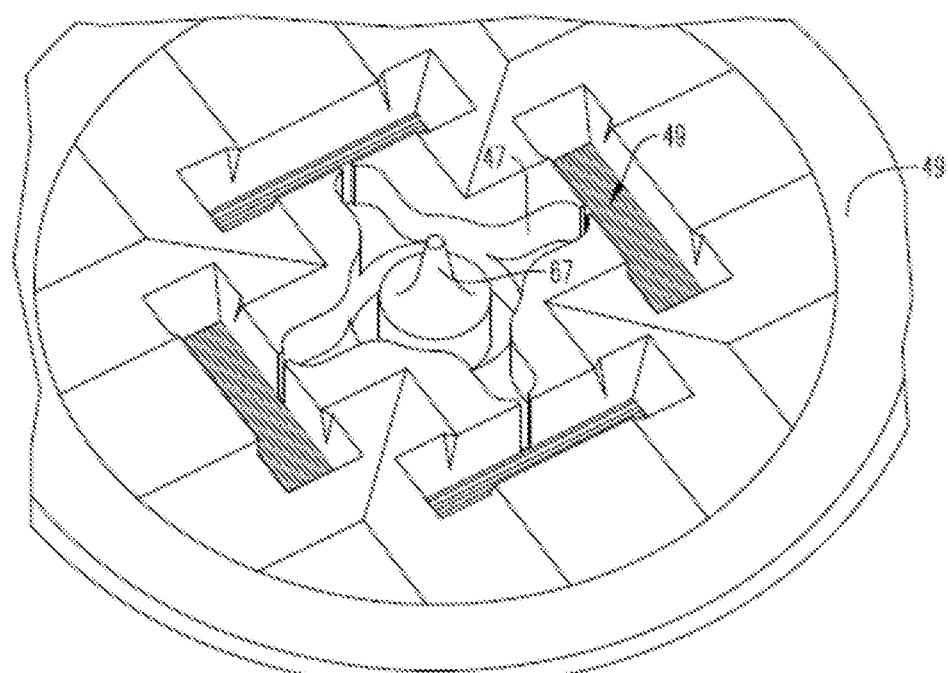
FIG. 1C is a top perspective view of a plate for forming a set of cutting inserts as shown in FIGS. 1A and 1B.
Figure 1D:
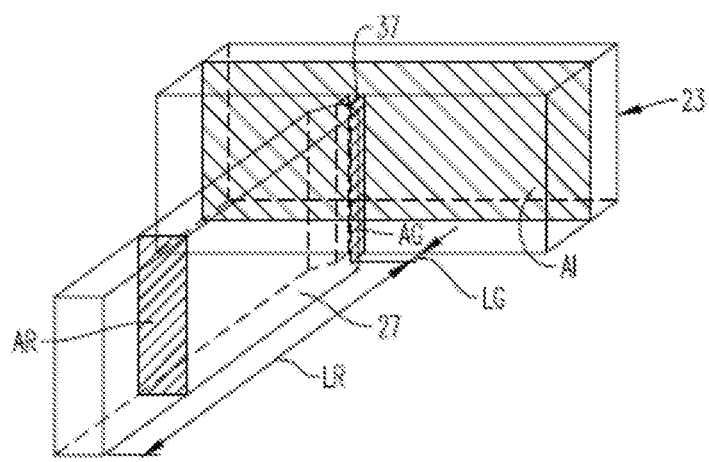
FIG. 1D is a schematic, perspective view of a runner, gate and insert portion of a set of cutting inserts of the type shown in FIGS. 1A and 1B.

The mold plate 49b can be provided with a tapered protrusion 67 as seen in FIG. 1C (showing a plate for forming a set 21 of inserts 23 as shown in FIGS. 1A-1B) such that, when the plates 49a and 49b are adjacent and define the mold cavity 49, the protrusion is received inside the sprue channel 45. When the molded part is formed, the protrusion 67 results in the formation of a hollow stem portion 25 as seen in FIG. 1A. This reduces the amount of material 39 that needs to be injected into the mold cavity 49 to form the set 21 of cutting inserts 23 and can help to direct flow of the material into the runner channels 47 from the sprue channel 45 and thus into mold cavity 49. A hollow stem portion may be used for stacking of molded parts during e.g. a coating process.

Figure 4:
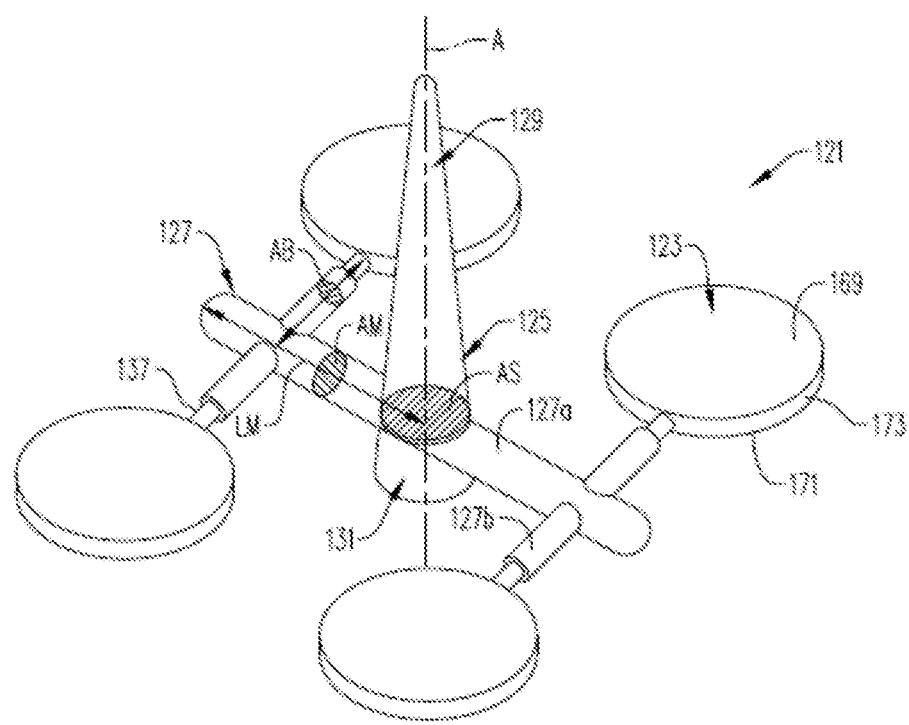
FIG. 4 is a top perspective view of a set of cutting inserts according to a further aspect of the present disclosure.

As seen in FIG. 4, in the set 121 of cutting inserts 123, at least one of the plurality of branch portions 127 includes a main portion 127a attached to and extending from the stem portion 125 and two or more branch portions 127b extending at non-zero angles from the main portions. Ordinarily, each branch portion 127b has a smaller cross-sectional area in a direction perpendicular to a longitudinal dimension of the branch portion than a cross-sectional area in a direction perpendicular to a longitudinal dimension of the main branch portion 127a for each branch portion 127. A gate portion 137 may be provided between each branch portion 127b and cutting insert 123.

As seen in FIGS. 1A-1B, 2A, 2B, 2C, and 4, 5, 6, and 7A-7B, each branch portion 27 (FIGS. 1A-1B); 27a, 27b, 27c (FIGS. 2A, 2B, 2C); 127 (FIG. 4); 227 (FIG. 5); 327 (FIG. 6); 427 (FIGS. 7A-7B) of the plurality of branch portions ordinarily extends radially from the stem portion 25, 25a, 25b, 25c, 125, 225, 325, 425, respectively. Typically, each branch portion of the plurality of branch portions is perpendicular to the longitudinal axis of the stem portion that extends between the top and the bottom ends of the stem portion. For all insert sets, and as illustrated with reference to the embodiment shown in FIG. 4, each branch portion 127 also typically has a smaller cross-sectional area AM or AB of the main portion 127a or the branch portion 127b (if provided) in a direction perpendicular to a longitudinal dimension LM or LB of the main portion or the branch portion than a cross-sectional area AS of the stem portion 125 in a direction along longitudinal axis A of the stem portion.

In the sets 21, 21a, 21b, 21c, 121, 221, 321, and 421 of cutting inserts 23, 23a, 23b, 23c, 123, 223, 323, 423, respectively, each cutting insert has a top surface 69, 69a, 69b, 69c, 169, 269, 369, 469, respectively, a bottom surface 71, 71a, 71b, 71c, 171, 271, 371, 471, respectively, and a side surface 73, 73a, 73b, 73c, 173, 273, 373, 473, respectively. The side surface may be in the form of a single surface, such as in the case of a circular or oval cutting insert, or plural surfaces, such as in the case of a cutting insert that is triangular, square, rectangular, etc. Ordinarily, the side surface 73, 73a, 73b, 73c, 173, 273, 373, 473 faces a corresponding branch portion 27, 27a, 27b, 27c, 127, 227, 327, 427.

When viewed perpendicular to a plane of the top surface 69, 69a-69c, 169, 269, 369, 469, each cutting insert 23, 23a, 23b, 23c, 123, 223, 323, 423, respectively, can have a first dimension measured in a first direction from a first location on the side surface of the cutting insert to a second location on the side surface of the cutting insert on an opposite side of the cutting insert from the first location, and a second dimension measured in a second direction, perpendicular to the first direction, from a third location on the side surface of the cutting insert to a fourth location on the side surface of the cutting insert on an opposite side of the cutting insert from the third location. In the sets 21, 221, 321, and 421 of cutting inserts 23, 223, 323, 423, one dimension, e.g., the second dimension, is shown as being shorter than the other, e.g., first dimension. In other words, the inserts can be elongated, e.g., rectangular, oval, elliptical, although they can also be square, circular (as in the set 121 of inserts 123 shown in FIG. 4), or other geometrical shapes.

For the set 21 of inserts 23 shown in FIGS. 1A-1B, the longer first dimension is measured perpendicular to the corresponding branch portions 27, seen perpendicular to the plane of the top surface 69. For the sets 221, 321, 421 of inserts 223, 323, 423 shown in FIGS. 5, 6, and 7A-7B, the shorter second dimension is measured perpendicular to the corresponding branch portions 227, 327, 427. The first dimension may be two to twenty times the second dimension preferably five to fifteen times the second dimension.

For the set 21 of cutting inserts 23 shown in FIGS. 1A-1B, each cutting insert 23 includes two cutting edges 22 extending in a transition between the top surface 69 and the side surface 73. Each cutting edge 22 includes a bottom cutting edge 24 configured for forming a bottom of a groove in a workpiece, and a first wall cutting edge 26a and a second wall cutting edge 26b located on opposite sides of the bottom cutting edge 24 being configured for simultaneously forming side walls of the groove. Each wall cutting edge 26a, 26b includes a corner cutting edge, and possibly a side cutting edge extending along the longer second dimension. A surface-wiping cutting edge may also form part of the wall cutting edge 26a, 26b for improving of surface finish of a side wall within of the groove. The first wall cutting edge 26a faces the stem portion 25 of the set 21 and is consequently located closer to the branch portion 27 than the second wall cutting edge 26b.

A median plane M of the cutting insert is defined that extends perpendicularly through the plane of the top surface 69 and the bottom cutting edge 22 and divides the cutting insert 23 in two equal or essentially equal halves. As measured in a direction perpendicular to the median plane M, the largest distance between the median plane M and each point of an intersection between the cutting insert 23 and a neighboring portion of the set 21 of cutting inserts 23, i.e. in this case the gate portion 37, is smaller than the largest distance between the first wall cutting edge 26a and the median plane M. The fracture surface is distant from and not intersected by the median plane M.

When the cutting insert 23 is removed from the set 21 of cutting insert 23, a fracture surface located on the side surface 73 is formed. As measured in a direction perpendicular to the median plane M, the largest distance between the median plane M and each point of the fracture surface is smaller than the largest distance between the first wall cutting edge 26b and the median plane M. When used for machining a groove in a workpiece, the bottom cutting edge 24 is used for forming a bottom of the groove and the first and second wall cutting edges 26a, 26b are simultaneously used for forming side walls of the groove. The fracture surface of the cutting insert 23 is thereby located within the machined groove, facing the side wall created by the first wall cutting edge 26a, and a clearance is provided between the fracture surface and the side wall of the groove.

Figure 5:
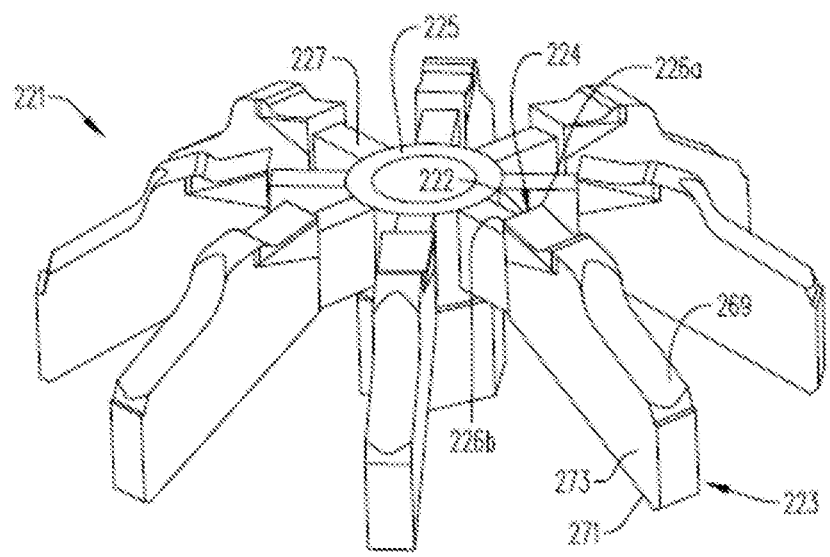
FIG. 5 is a top perspective view of a set of cutting inserts according to a further aspect of the present disclosure.
Figure 6:
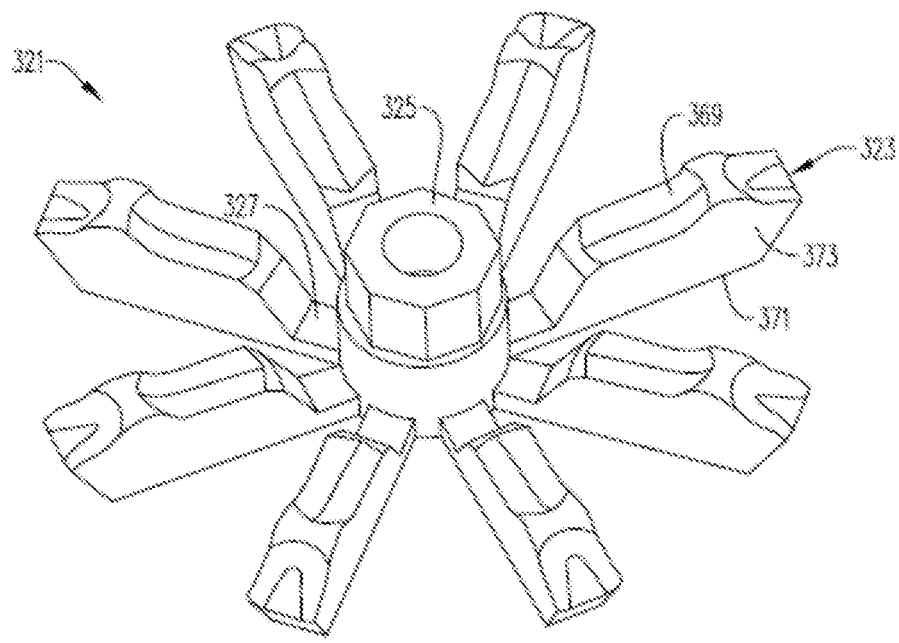
FIG. 6 is a top perspective view of a set of cutting inserts according to a further aspect of the present disclosure.

In the set 221 of cutting inserts 223 shown in FIG. 5, each cutting insert 223 is configured for machining a groove in a workpiece. Each cutting insert 223 includes a cutting edge 222 extending in a transition between the top surface 269 and the side surface 273. Each cutting edge 222 includes a bottom cutting edge 224 configured for forming a bottom of a groove in a workpiece, and a first wall cutting edge 226a and a second wall cutting edge 226b located on opposite sides of the bottom cutting edge 224 and being configured for simultaneously forming side walls of the groove. Each wall cutting edge 226a, 226b includes a corner cutting edge, and possibly a side cutting edge. A surface-wiping cutting edge may also form part of the wall cutting edge for improving of surface finish of a side wall within of the groove. The bottom cutting edge 224 here faces in the direction of the stem portion 225 of the set 221. When the cutting insert 223 is removed from the branch portion 227, a created fracture surface is therefore located on the side surface 273 of the cutting insert 223 below the bottom cutting edge 224. During machining, the bottom cutting edge 224 is used for forming a bottom of the groove and the fracture surface is in this case located within the machined groove, facing the bottom of the groove. A clearance is provided between the fracture surface and the bottom of the groove, e.g. by tilting the cutting insert 223.

As seen in FIG. 2A, a bottom surface 71a of each cutting insert 21a can lie on (or above) a plane defined by the bottom surface of each branch portion 27a. As seen in FIG. 2B, the bottom surface 71b of each cutting insert 23b can lie below a plane defined by the bottom surface of each branch portion 27b. As seen in FIG. 2C, the bottom surface 71c of each cutting insert 23c can be partially above and partially below a plane defined by the bottom surface of each branch portion 27c.

Additive manufacturing can be used as an alternative to forming a set of cutting inserts by injection molding. Additive manufacturing is usually based on a 3-dimensional CAD (computer aided design) drawing that can be manufactured directly into a solid component by firing lasers, responding to the cues of the CAD drawing, into a bed of powder. The method of making a set of cutting inserts 23, 23a, 23b, 23c, 123, 223, 323, 423 by additive manufacturing may comprise the steps of:

(a) depositing a tungsten carbide powder material in a bed or in a configuration;

(b) selectively fusing the tungsten carbide powder material by laser scanning the layers generated by a three dimensional modeling program on the surface of a powder bed, such as making a start of the bottom end 31 first;

(c) relative lowering of the powder bed by one layer thickness, wherein for example the powder bed is lowered relative to a laser or the laser is raised relative to the powder bed, to adjust a distance therebetween to a desired value;

(d) repeating steps (a) to (c) until the set of cutting inserts includes
   a stem portion (25, 25a, 25b, 25c, 125, 225, 325, 425);
   a plurality of branch portions (27, 27a, 27b, 27c, 127, 227, 327, 427) attached to and extending from the stem portion (25, 25a, 25b, 25c, 125, 225, 325, 425); and
   at least one cutting insert (23, 23a, 23b, 23c, 123, 223, 323, 423) attached to each of the plurality of branch portions (27, 27a, 27, b27c, 127, 227, 327, 427); and (e) optionally/possibly performing post processing of the set of cutting inserts.

The set of cutting inserts made through additive manufacturing (AM) such as metal 3D printing processes which use binders, or fully dense metal processes like selective laser sintering (SLS) or direct metal laser sintering (DMLS). The latter technology uses a high-power laser to fuse small particles of tungsten carbide powder material into a set of cutting inserts that has the described three-dimensional shape. The laser selectively fuses the tungsten carbide powder material by scanning the cross-sections (or layers) generated by a three-dimensional modeling program on the surface of a powder bed. After each cross-section is scanned, the powder bed is relatively lowered by one layer thickness. Then a new layer of material is applied on top and the process is repeated until the set of cutting inserts is completed. Using so called powder bed fusion, where a thin layer of powder is melted by a laser and is solidified very rapidly, may not result in an equilibrium crystal structure in the component and will often require subsequent heat treatment in a separate furnace. AM may not result in a perfect surface finish so some kind of machining or grinding or surface modification may also be required on the set of cutting inserts. By making a stem portion 25, 25a, 25b, 25c, 125, 225, 325, 425 integral with the set of cutting inserts, the method according to this aspect of the disclosure also facilitates keeping a plurality of inserts together during the manufacturing, thereby tending to reduce lost products.

The additive manufacturing process can be advantageous for the manufacture of thinner inserts. After producing the set of inserts, the stem can function as a handle for the set of inserts, such as during heat treatment, grinding and/or coating. The inserts can be detached from the set after processing is completed, or as needed by an end user. In short, an amount of post processing may be required before a part could be described as functional for some engineering applications.

The set of cutting inserts 23, 23a, 23b, 23c, 123, 223, 323, 423 may also be formed using additive manufacturing in the form of a binder jetting process, comprising the steps of:

(a) depositing a tungsten carbide powder material layer in a bed or configuration, e.g. wherein the layer is generated by a three-dimensional modeling program;

(b) selectively depositing a binder adhesive onto the tungsten carbide powder material layer, wherein the binder adhesive is deposited using e.g. a print head in accordance with a model generated by the three-dimensional modeling program;

(c) relative lowering of the powder bed by one layer thickness, i.e. either by lowering the powder bed or by raising e.g. a print head used to deposit the powder material;

(d) repeating steps (a) to (c) until the set 21, 21a, 21b, 21c, 121, 221, 321, 421 of cutting inserts 23, 23a, 23b, 23c, 123, 223, 323, 423 is formed;

(e) sintering of the set of cutting inserts, and (f) optionally/possibly post processing of the set of cutting inserts.

In the binder jetting process, the set of cutting inserts is formed where the powder material is bound to the binder adhesive, which is preferably a liquid binder adhesive. Once steps A-C are completed, the set of cutting inserts may be removed from unbound powder material, sintered and otherwise post processed.

Thus, the sets 21, 21a, 21b, 21c, 121, 221, 321, 421 of cutting inserts 23, 23a, 23b, 23c, 123, 223, 323, 423, respectively, each includes a stem portion 25, 25a, 25b, 25c, 125, 225, 325, 425, respectively, a plurality of branch portions 27, 27a, 27b, 27c, 127, 227, 327, 427, respectively, attached to and extending from the stem portion, and at least one cutting insert 23, 23a, 23b, 23c, 123, 223, 323, 423, respectively, attached to each of the plurality of branch portions. The stem portion 25, 25a, 25b, 25c, 125, 225, 325, 425 has a longitudinal axis A (see FIGS. 2A, 2B, 2C and 4) extending between a top end 29, 29a, 29b, 29c, 129 of the stem portion and a bottom end 31, 31a, 31b, 31c, 131 of the stem portion and at least one of the top end of the stem portion is disposed along the longitudinal axis above uppermost portions 33, 33a, 33b, 33c of each cutting insert, and the bottom end of the stem portion is disposed along the longitudinal axis below lowermost portions 35, 35a, 35b, 35c of each cutting insert.

The expression that at least one of the top end of the stem portion is disposed along the longitudinal axis above uppermost portions of each cutting insert, and the bottom end of the stem portion is disposed along the longitudinal axis below lowermost portions of each cutting insert encompasses one or more of the following configurations:
   top end of the stem portion is disposed above an uppermost portion of each cutting insert;
   top end of the stem portion is disposed below an uppermost portion of each cutting insert;
   top end of the stem portion is disposed below a lowermost portion of each cutting insert;
   a bottom end of the stem portion is disposed below a lowermost portion of each cutting insert;
   a bottom end of the stem portion is disposed above a lowermost portion of each cutting insert; and
   a bottom end of the stem portion is disposed above an uppermost portion of each cutting insert.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "front", "forward", "rear" and "rearwards" refer to features as shown in the current drawings and as perceived by the skilled person. For example, the terms "upper" and "top" mean features facing towards the injection chamber 51 of the barrel 53, while the terms "bottom" and "rear" mean features facing away from the injection chamber as understood by the skilled person.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A set of cutting inserts, the set of cutting inserts comprising:
   a stem portion;
   a plurality of branch portions attached to and extending from the stem portion; and
   at least one cutting insert attached to each of the plurality of branch portions, wherein the set is entirely or partly made by injection molding and/or additive manufacturing and comprises tungsten carbide, wherein the stem portion has a longitudinal axis extending between a top end of the stem portion and a bottom end of the stem portion, and at least one of the top end of the stem portion is disposed along the longitudinal axis above an uppermost portion of each at least one cutting insert, and the bottom end of the stem portion is disposed along the longitudinal axis below a lowermost portion of each at least one cutting insert, wherein the at least one cutting insert can be removed from the set of cutting inserts.

2. The set of cutting inserts as set forth in claim 1, further comprising a gate portion between each branch portion and each at least one cutting insert, each gate portion having a smaller cross-sectional area in a direction perpendicular to a longitudinal dimension of the gate portion than a cross-sectional area of the branch portion in a direction perpendicular to a longitudinal dimension of the branch portion.

3. The set of cutting inserts as set forth in claim 1, wherein at least one of the plurality of branch portions includes a main portion attached to and extending from the stem portion and two or more branch portions extending at non-zero angles from the main portions.

4. The set of cutting inserts as set forth in claim 3, wherein each branch portion has a smaller cross-sectional area in a direction perpendicular to a longitudinal dimension of the branch portion than a cross-sectional area of the main branch portion in a direction perpendicular to a longitudinal dimension of the main branch portion for each branch portion.

5. The set of cutting inserts as set forth in claim 1, wherein each branch portion of the plurality of branch portions extends radially from the stem portion.

6. The set of cutting inserts as set forth in claim 1, wherein each branch portion of the plurality of branch portions is perpendicular to the longitudinal axis of the stem portion.

7. The set of cutting inserts as set forth in claim 1, wherein each branch portion has a smaller cross-sectional area in a direction perpendicular to a longitudinal dimension of the branch portion than a cross-sectional area of the stem portion in a direction perpendicular to the longitudinal axis of the stem portion.

8. The set of cutting inserts as set forth in claim 1, wherein each cutting insert has a top surface, a bottom surface, and a side surface, the side surface facing a corresponding branch portion.

9. The set of cutting inserts as set forth in claim 8, wherein, when viewed perpendicular to a plane of the top surface, each cutting insert has a first dimension measured in a first direction from a first location on the side surface of the cutting insert to a second location on the side surface of the cutting insert on an opposite side of the cutting insert from the first location, and a second dimension measured in a second direction, perpendicular to the first direction, from a third location on the side surface of the cutting insert to a fourth location on the side surface of the cutting insert on an opposite side of the cutting insert from the third location, the second dimension being shorter than the first dimension so that the cutting insert has an elongated shape.

10. The set of cutting inserts as set forth in claim 9, wherein each cutting insert is attached to a corresponding branch portion such that its longer first dimension faces the corresponding branch portion, wherein each cutting insert includes a cutting edge for forming a groove in a workpiece, the cutting edge extending in a transition between the top surface and the side surface, the cutting edge having a bottom cutting edge extending along the shorter second dimension, a first wall cutting edge, and a second wall cutting edge, wherein the first and second wall cutting edges extend on opposite sides of the bottom cutting edge and wherein the first wall cutting edge is located closer to the corresponding branch portion than the second wall cutting edge, wherein a median plane of the cutting insert is defined that extends perpendicularly through the plane of the top surface and the bottom cutting edge and divides the cutting insert in two equal or essentially equal halves, wherein, as measured in a direction perpendicular to the median plane, the largest distance between the median plane and each point of an intersection between the cutting insert and a neighboring portion of the set of cutting inserts is smaller than the largest distance between the first wall cutting edge and the median plane.

11. A cutting insert for grooving obtained from the set of cutting inserts as set forth in claim 10, the cutting insert including a fracture surface located on the side surface, wherein the fracture surface results from removing the cutting insert from the branch portion, wherein the fracture surface is remote from the median plane, wherein, as measured in a direction perpendicular to the median plane, the largest distance between the median plane and each point of the fracture surface is smaller than the largest distance between the first wall cutting edge and the median plane.

12. The set of cutting inserts as set forth in claim 1, wherein a bottom surface of each cutting insert lies on or above a plane defined by a bottom surface of each branch portion.

13. The set of cutting inserts as set forth in claim 1, wherein the set of cutting inserts is formed by injection molding.

* * * * *